United States Patent [19]

Nelson et al.

[11] Patent Number: 4,685,402
[45] Date of Patent: Aug. 11, 1987

[54] FIRE RESISTIVE CABINET FOR STORING EASILY DAMAGEABLE ELECTRONIC DATA STORAGE MATERIALS

[75] Inventors: Lowell F. Nelson; Robert A. Laird, both of Muskegon, Mich.

[73] Assignee: The Shaw-Walker Company, Muskegon, Mich.

[21] Appl. No.: 821,252

[22] Filed: Jan. 22, 1986

[51] Int. Cl.⁴ .............................. E04F 5/00; E04F 5/16
[52] U.S. Cl. ........................................ 109/65; 109/68; 109/82; 312/214
[58] Field of Search .................. 109/29, 57, 65, 68, 109/76, 80, 82, 84; 52/309.8; 312/214; 220/431, 432

[56] References Cited

U.S. PATENT DOCUMENTS

| | | | |
|---|---|---|---|
| 1,606,151 | 11/1926 | Dahnke | 109/68 |
| 3,709,169 | 1/1973 | Gauger, Jr. et al. | 109/29 |
| 3,762,787 | 10/1973 | Grubb | 312/214 |
| 3,888,557 | 6/1975 | Anderson et al. | 312/214 |
| 4,413,869 | 11/1983 | Pichler et al. | 312/214 |
| 4,574,454 | 3/1986 | Dyson | 109/65 |

*Primary Examiner*—Gary L. Smith
*Assistant Examiner*—Neill Wilson
*Attorney, Agent, or Firm*—Kinzer, Plyer, Dorn & McEachran

[57] ABSTRACT

A fire resistive cabinet for storing easily damageable electronic data storage materials such as floppy discs to protect them against the deleterious effects of high temperature and high humidity. The cabinet includes an outer housing of fire resistive construction and an insulated inner container. A combined infrared barrier and vapor barrier is formed as a bag which contains the inner insulated container. An endothermic phase transformation material is carried in the double walls of a moisture proof bag and fits inside the polyurethane foam insulation of the inner container. An insulated removable cover closes an opening into the inner insulated container. The width and height of the container are identical so that the container can be inverted to provide either a right hand or a left hand swing for the insulated door of the fire resistive cabinet.

4 Claims, 7 Drawing Figures

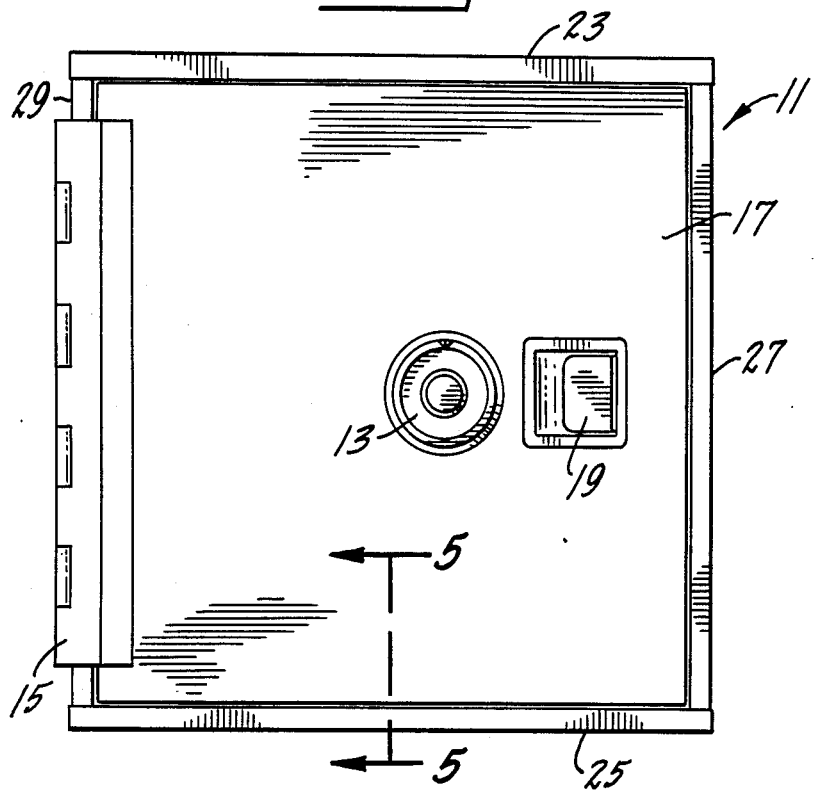
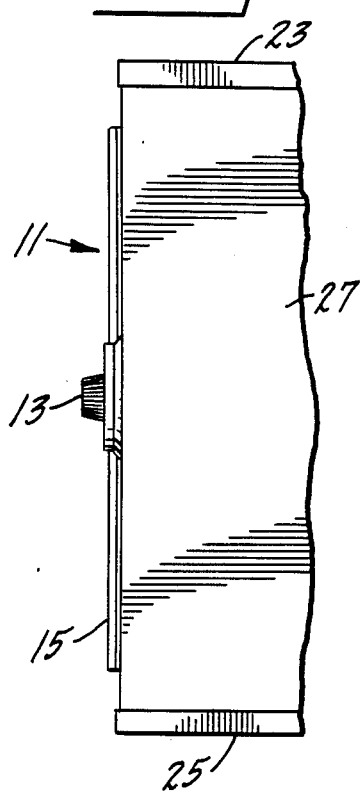
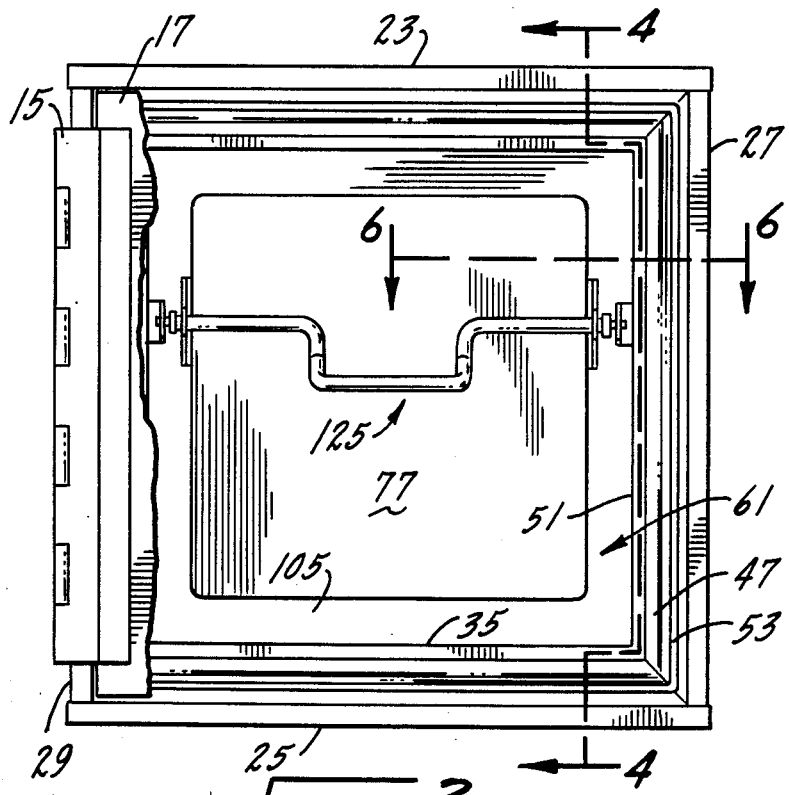
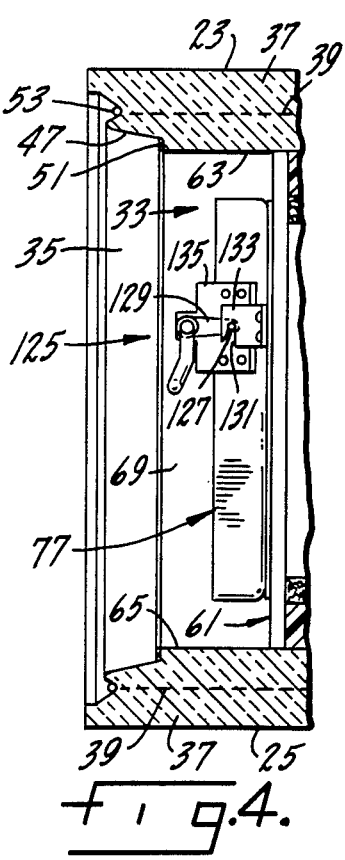

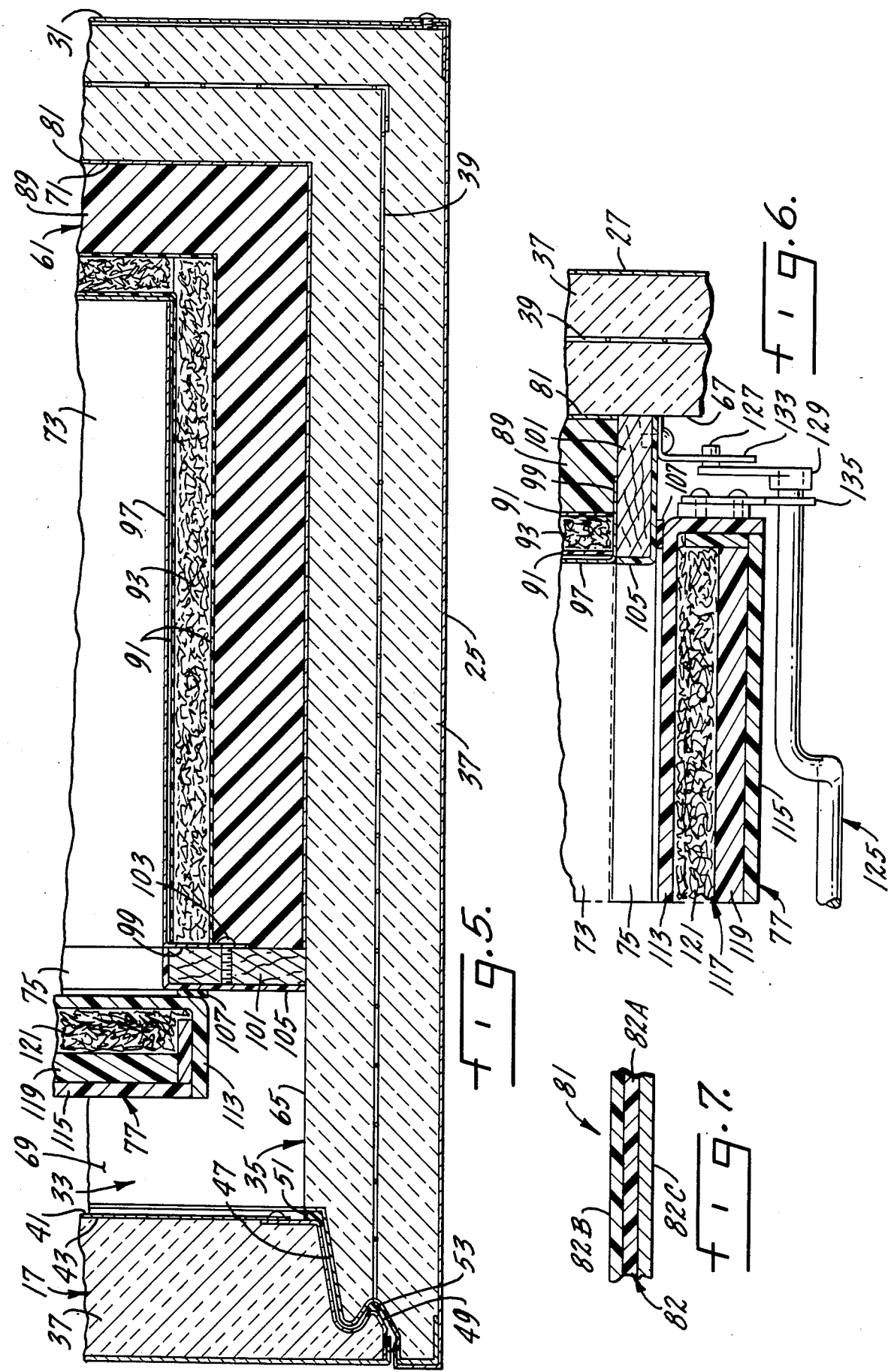

FIRE RESISTIVE CABINET FOR STORING EASILY DAMAGEABLE ELECTRONIC DATA STORAGE MATERIALS

BACKGROUND AND SUMMARY OF THE INVENTION

This invention is directed to a fire resistive storage container for electronic data storage materials and, in particular, for the storage of floppy discs which are extremely sensitive to the deleterious effects of high temperature and high humidity.

An object of this invention is a fire resistive storage container for easily damageable electronic data storage material that is of compact size and lightweight.

Another object of this invention is a fire resistive storage container having an inner insulated compartment that increases protection against damaging high temperatures by the provision of an infrared heat reflective barrier that prevents infrared heat from entering the insulation of the inner compartment.

Another object of this invention is a fire resistive storage container for easily damageable electronic data storage material having an infrared reflective barrier that is simple and economical to manufacture and install.

Another object of this invention is an infrared reflective barrier that also functions as a moisture barrier to prevent the water bound in the insulation of the outer fire resistive storage container from entering the insulation of the inner compartment.

Another object of this invention is an infrared reflective barrier and moisture barrier that can be constructed in the form of a bag for ease of installation.

Another object of this invention is a fire resistive storage cabinet which can be installed for left or right hand swing of the cabinet door without modification of the cabinet simply by turning the cabinet upside down before installation.

Another object of this invention is a heat transfer barrier of an endothermic phase transformation material that can be preassembled in a moisture proof double walled bag prior to installation in the inner compartment of the fire resistive storage container.

Other objects may be found in the following specification, claims and drawings.

BRIEF DESCRIPTION OF THE DRAWINGS

FIG. 1 is a front elevational view of a fire resistive storage container embodying the novel aspects of this invention;

FIG. 2 is a partial side elevational view of the fire resistive storage cabinet of FIG. 1;

FIG. 3 a front elevational view similar to FIG. 1 with a portion of the door of the outer fire resistive storage container broken away for clarity of illustration;

FIG. 4 is a partial cross-sectional view taken along line 4—4 of FIG. 3;

FIG. 5 an enlarged partial cross-sectional view taken along line 5—5 of FIG. 1;

FIG. 6 is an enlarged partial cross-sectional view taken along line 6—6 of FIG. 3.; and FIG. 7 is an enlarged cross-sectional view of the laminate forming the infrared reflective and moisture barrier.

DESCRIPTION OF THE PREFERRED EMBODIMENT

The fire resistive storage container 11 of this invention shown in FIG. 1 of the drawings is intended for the safe and convenient storage of electronic data storage materials and, in particular, for the storage of floppy discs which are extremely sensitive to the deleterious effects of high tempterature and high humidity. The fire resistive storage container 11 of this invention is designed to be compact in size and lightweight so it can be utilized at or adjacent to a computer terminal or word processing station to increase the likelihood that the valuable floppy discs and other electronic data storage materials will be returned to the safety of the fire resistive storage container immediately after use.

As shown in FIGS. 1 and 2 of the drawings, the container 11 can be equipped with a combination locking mechanism 13 or a key locking mechanism, which is not shown, to provide security against loss, theft or unauthorized removal of the electronic data storage material, as well as protection against damage by fire and water. The fire resistive storage container shown in FIG. 1 has a hinge 15 providing a left hand swing for the door 17. The fire resistive storage cabinet 11 is dimensioned with its height the same as its width so that it can be inverted to provide a container with a right hand door swing without any modification of the structure of the storage container. A latch 19 is provided for opening the door 17 after the combination locking mechanism is set to open.

The fire resistive storage cabinet 11, as is conventional, has an insulated top wall 23, bottom wall 25, side walls 27 and 29, and an end wall 31 defining a hollow cavity 33. An opening 35 leads into the hollow cavity and this opening is closed by the door 17 which is also an insulated door. As is also conventional, the walls 23 through 31, and the door 17 have an outer skin of sheet metal and a thick lining 37 of a fire resistive material such as gypsum which has water chemically bound therein. Also mixed in the gypsum is one-half pound of chopped glass roving pieces, each a half inch long, per cubic foot of gypsum for additional strength. Additionally, sheets 39 of metal hardware cloth are inserted in the gypsum of the walls for reinforcing. The inner face of the door 17 has a sheet metal panel 41 attached thereto, and located on the inner side of the panel 41 is a reflective barrier of aluminum foil 43 one mil. thick. The aluminum functions as an infrared reflective barrier and a moisture barrier for the gypsum installed in the door 17.

The door jam 47 at the opening 35 into the hollow cavity 33 of the outer storage container is convoluted in cross-section and the door frame 49 is of complementary crosssection to tightly fit together to retard the passage of heat and flame into the hollow cavity 33. A silicon rubber gasket 51 is cemented into place at the inner edge of the door jam 47 while a steel spring reinforced glass bead gasket 53 is cemented into place between the door 17 and the door jam 47 outwardly of the gasket 51.

An inner container 61 which actually holds the electronic data storage materials is positioned in the cavity 33 of the outer fire resistive storage container. The inner compartment or container 61 includes a top wall 63, a bottom wall 65, side walls 67 and 69 and an end wall 71 which define a hollow cavity 73 having an opening 75 leading therein. The walls of the inner container are positioned adjacent corresponding walls of the outer fire resistive storage container, and the opening of the inner container 75 aligns with the opening 35 of the outer container. The opening 75 into the inner cavity of the inner container is closed by a removable cover 77.

An open ended bag 81 is installed in the hollow cavity 73 of the inner container and is sized and shaped so that it fits snugly against the top, bottom, side and end walls of the cavity 33 of the outer container 11. The bag is made of a laminate 82 having an outer layer of a film 82A of polyethylene terephthalate resin sold under the trademark "MYLAR" and an inner layer 82B of a heat sealable material such as polyethylene or vinyl. The outer surface of the film of polyethylene terephthalate resin is metallized with aluminum 82C to provide the infrared reflective barrier. An enlarged cross-section view of the laminate of the bag 81 is shown in FIG. 7 of the drawings. The bag also functions as a moisture barrier to prevent the water entrapped in the gypsum lining 37 of the insulation of the outer fire resistive cabinet from penetrating the inner container 61. The manufacture of the infrared reflective barrier and vapor barrier as a bag 81 reduces the cost of construction and simplifies the installation since the laminated material of the infrared and vapor barrier does not have to be applied separately to each inside surface of the gypsum lining 37 of the outer fire resistive container, but instead is inserted as a single unit.

A layer of polyurethane foam 89, approximately 1⅜ inches thick, is either prefoamed or foamed in place with the foam layer abutting the inside of the walls of the bag 81 which form the infrared reflective barrier and vapor barrier. Positioned inside the polyurethane foam layer 89 is a double walled moisture proof bag 91 which contains between its double walls a layer of an endothermic phase transformation material 93 with the layer being approximately ¾ of an inch thick. The bag 91 is preferably made of a heat sealable plastic such as polyethylene. In this embodiment, the endothermic phase transformation material is sodium thiosulfate which is melted and poured into the bag 91 between the double walls thereof and allowed to crystallize. After crystallization, the bag is inserted inside the cavity formed by the layer of polyurethane foam, thereby simplifying of the installation of the endothermic phase transformation material and reducing the cost of construction of the inner compartment. The polyethylene walls of the double walled bag 91 also function as moisture barriers to prevent loss of the sodium thiosulfate when it changes from a crystalline to a liquid phase upon the application of heat. The inner walls of the double walled bag 91 essentially define the limits of the inner storage cavity 73.

A sheet metal lining 97 is located inside the cavity 73 and engages the inner walls of the double walled bag 91 to protect these walls against mechanical injury. The ends of the metal lining are outwardly flared at the opening 75 into the cavity 73 to form a collar 99 that covers the outer end of the double walled bag 91 and partially extends over the outer end of the polyurethane foam layer 89. A plywood frame 101 is positioned outwardly of the metal collar 99 and the metal collar is fastened to the plywood frame by wood screws 103. An ABS plastic cap 105 is installed to cover the outer surface of the plywood frame 101. A gasket 107 is attached to the plastic cap 105.

The opening 75 into the inner hollow cavity 73 of the inner compartment is closed by the removable cover 77. The removable cover has an inner body 113 and an outer lid 115, each formed of ABS plastic with the outer lid seated in the inner body to form a hollow space 117 therebetween. Located in the hollow space next to the outer lid is a onehalf inch thick layer 119 of rigid polyurethane. Located inwardly of the polyurethane foam layer is a layer 121 of sodium thiosulfate which is poured in place and allowed to crystallize. The infrared radiation barrier and moisture protection for the polyurethane foam layer is provided by the aluminum foil 43 which is adhered to the interior of the door 17 of the fire resistive outer cabinet.

The removable cover 77 is removably mounted on the inner container 61 by means of a locking handle 125 which is pivotally mounted on the outer lid 115 of the removable cover 77. The locking handle shown in enlarged detail in FIG. 6 includes stubs 127 projecting outwardly from crank arms 129 formed as part of the locking handle. The stubs can be moved in and out of tapered notches 131 (shown in FIG. 4) formed in brackets 133 mounted on the plywood frame 101 of the inner container 61 upon rotation of the handle. The handle 125 is pivoted in openings formed in arms 135 located on opposite sides of the outer lid 115 of the removable cover 77. The locking handle 125 can be pivoted between a locked position where the stubs 127 are seated in the tapered notches 131 to an unlocked position where the stubs are rotated to a position clear of the tapered notches. Although the drawings show the tapered notches 131 opening downwardly and the handle projecting downwardly in its locked position, it should be appreciated that the removable cover mounting mechanism will also operate satisfactorily if the removable cover is inverted. This will occur if the storage container 11 is turned over to reverse the swing of the door 17.

The use, operation and function of this invention are as follows:

Although a properly designed and constructed insulated fire resistive cabinet satisfactorily protects papers and other similar materials against the effects of fire, such a fire resistive cabinet does not offer sufficient protection for electronic data storage materials, especially the electronic data storage materials which are commonly known as floppy discs. Floppy discs and similar electronic data storage materials are easily damaged by high heat and high humidity. High humidity often occurs in an insulated fire resistive cabinet exposed to fire where the moisture which is chemically bound in the insulation of the insulated fire resistive cabinet is driven off by the heat of the fire. Various testing organizations have set maximum limits on the temperature and humidity which are permitted to exist in containers approved for the storage of the above-mentioned, easily damageable materials upon the exposure to fire. For example, the Underwriter's Laboratories, Inc. sets a maximum temperature of 125° F. and a maximum relative humidity of 80%. The insulated inner container for a fire resistive file cabinet shown in U.S. Pat. No. 3,888,557, assigned to the same assignee as this application, is designed to limit the temperature rise to a maximum of 150° F. and a maximum relative humidity of 85%, which parameters would be unsuitable for the storage of floppy discs.

The improved protection provided by the storage container of this invention is at least in part obtained by an improved infrared reflective barrier and improved moisture barriers, which are provided first by the material of the infrared heat reflective barrier and secondly, by the doublewalled moisture proof bag which holds an endothermic phase transformation material. The fire resistive storage container of this invention also is more easily and economically constructed than previous types of such containers since the infrared heat reflective barrier and the container for the endothermic phase transformation material are formed as bags which can easily be inserted into the finished cabinet.

Whereas, the preferred form of our invention has been illustrated and described, it should be understood and appreciated that modifications, alterations and changes can be made to the preferred embodiments without departing from the teachings of our invention. Therefore, the scope of the invention should be limited only by the claims appended hereto.

We claim:

1. A fire resistive cabinet for storing easily damageable electronic data storage materials such as floppy discs to protect them against the deleterious effects of heat and moisture, said cabinet including:

an outer housing of fire resistive construction having top, bottom and side walls and one end wall defining a cavity with an opening into the cavity and a door closing the opening into the cavity, an inner compartment installed in the cavity of the outer housing and having an inner cavity, said inner compartment including top, bottom and side walls and one end wall defining said inner cavity with each of said walls abutting a corresponding wall of the outer housing and having an opening which aligns with the opening into the cavity of the outer housing, an infrared reflective barrier formed as the outer element of the inner compartment, a layer of polyurethane foam located inwardly of the infrared barrier in each wall, a layer of endothermic phase transformation material located inwardly of the layer of polyurethane foam in each wall, the infrared reflective barrier formed as a bag which is shaped and dimensioned to snugly fit into the cavity of the outer fire resistive housing and to contain the inner layer of polyurethane foam and the endothermic phase transformation material, and an insulated removable cover closing the opening into the inner cavity of the inner compartment.

2. The fire resistive cabinet of claim 1 in which the infrared barrier bag is formed of a laminate having an outer layer of polyethylene terephthalate resin film and an inner layer of a heat sealable material such as polyethylene or vinyl with the outer surface of the polyethylene terephthalate resin film metallized to provide the infrared reflective barrier.

3. The fire resistive cabinet of claim 1 in which the layer of endothermic phase transformation material is confined between inner and outer moisture proof walls of a double walled bag, said bag being shaped and dimensioned to fit snugly within the layer of polyurethane foam with the inner wall of said bag essentially defining said inner cavity of said inner compartment.

4. The fire resistive cabinet of claim 1 in which the removable cover includes a hollow housing defined by walls of ABS plastic with an outer slab of polyurethane and an inner layer of an endothermic phase transformation material located in said hollow housing.

* * * * *